Oct. 20, 1931. R. T. HOSKING Re. 18,227
LOCK WASHER
Original Filed Feb. 14; 1925
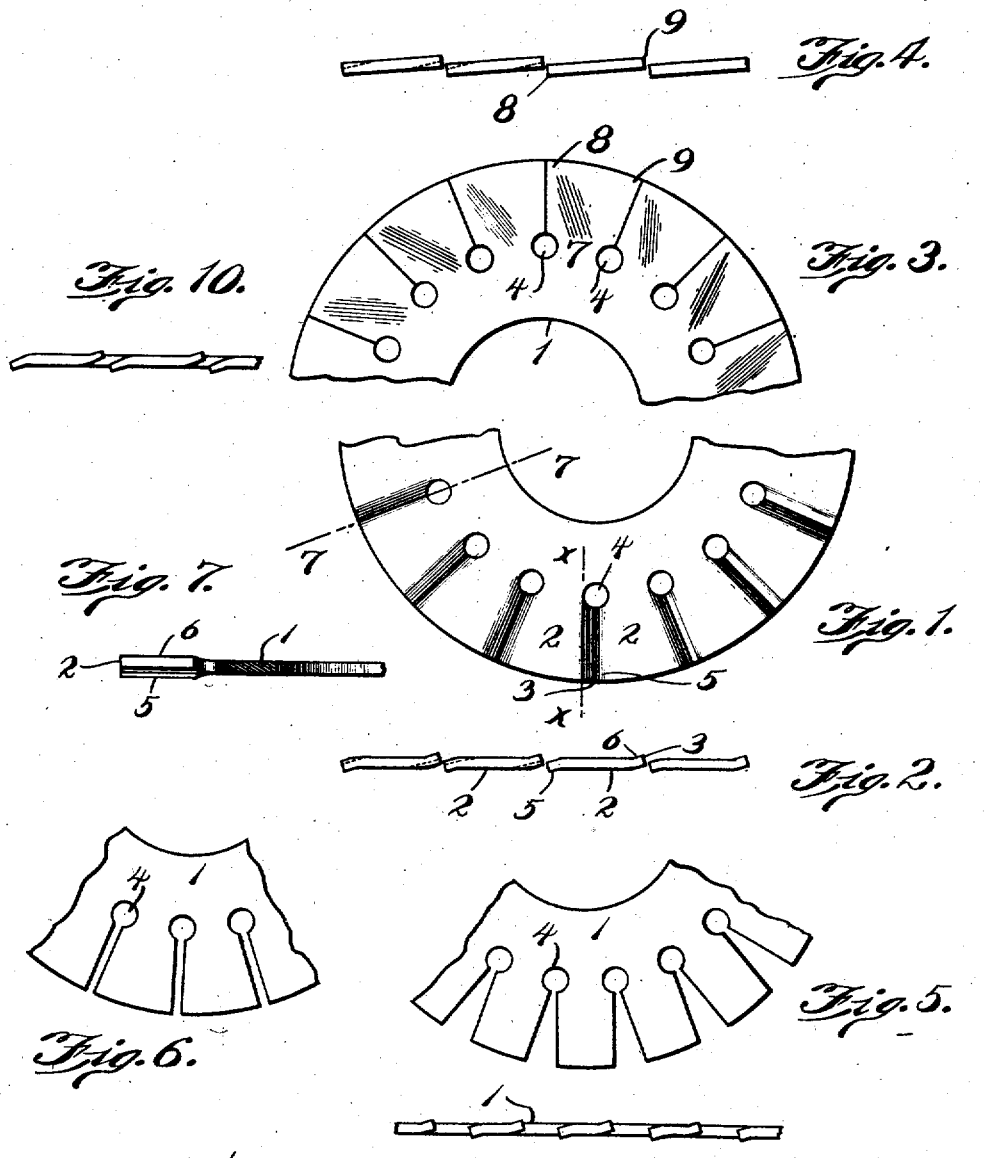
Inventor:
Richard T. Hosking
By Clever, Coy & Mosle
Attys.

Reissued Oct. 20, 1931

Re. 18,227

UNITED STATES PATENT OFFICE

RICHARD T. HOSKING, OF WILMETTE, ILLINOIS, ASSIGNOR, BY MESNE ASSIGNMENTS, TO H. R. HOUGH COMPANY, A CORPORATION OF ILLINOIS

LOCK WASHER

Original No. 1,615,382, dated January 25, 1927, Serial No. 9,145, filed February 14, 1925. Application for reissue filed August 6, 1931. Serial No. 555,588.

This invention relates to lock washers for nuts and bolts, the washers being of the type in which the base of the nut or head of the bolt is locked to the superstructure by the biting action of the washer teeth.

The washers of my invention are made by punching or otherwise cutting the center out of a piece of spring steel or otherwise to form a bolt passage, and by forming a series of leaves or tongues by cutting radial kerfs, notches or slits extending from the inner or outer periphery, as the case may be part way across the annular ring or body of the washer. The prongs or leaves formed by these slits, notches or kerfs are constructed and arranged to provide a plurality of work-engaging edges as distinguished from corners, and which edges are adapted to effectively bite into the work to resist the relative turning of the work or parts engaged by the washer.

One of the objects of my invention is to provide a lock washer having a series of substantially radially extending prongs which are formed by slitting, kerfing or notching the metal thereof, and by bending, flanging or axially offsetting the leaves along lines parallel with their lateral edges and out of the plane of the body of the washer and in a manner to provide a very rigid locking tooth giving an effective strutting action, and wherein these opposed edges extend substantially parallel to the body of the stock and constitute work-engaging or biting edges of considerable length and considerable rigidity, whereby, due to the fact that in the slitting or notching operation sufficient metal is removed to preclude any overlapping of these opposed edges of adjacent prongs in the event that the metal of the deflected portions stretches, the work-gripping effectiveness of the biting edges is enhanced and assured.

Yet another object of my invention resides in providing a lock washer with a plurality of substantially radially extending prongs or leaves formed by substantially radially cutting, notching or slitting the washer, and in further cutting, notching or slitting the prongs or leaves of the washer at their roots in such a manner as to permit said prongs or leaves to be bent along their entire radial margins out of the plane of the body of said leaves to form extended work-engaging portions.

Yet another object of my invention resides in forming the lateral edges of the metal between the slits, kerfs or notches which provide the prongs or leaves, somewhat thinner than the stock or body of the washer, and in offsetting these thinned edges, whereby such edges cannot be completely flattened down when the nut is clamped tight, and wherefore they never lose their capacity for biting the work as soon as the work tends to unscrew.

Yet another object of my invention resides in forming a lock washer of the radially slit or notched type, and wherein the longitudinal margins of the leaves or prongs are deflected out of the plane of the prong and parallel to the edge in such a manner that the deflected portion is substantially equal in circumferential length to the thickness of the stock, is substantially square in cross-section, and wherein the biting edge formed by the deflected portion is spaced from the plane of the body of the prong a distance less than the thickness of the stock, whereby a very strong and extended biting edge is provided.

Another object of my invention is to provide a lock washer of the before-mentioned type, in which the ring-shaped body is so cut or formed that the tongues or leaves cannot overlap in the event that they stretch as a result of being bent relatively to the body.

Another object of my invention is to prevent the cracking of the metal of the body of the washer during manufacture and use of the lock washer, and also to increase the length of the effective biting edge and to keep it rectilinear or unwarped, and thereby correspondingly increasing the gripping power of the washer, by forming at the inner end of the slits, kerfs or notches which form the prongs, a substantially circumferentially or laterally extending slit, notch or hole in the body of the metal.

Yet another object of my invention resides in a modified form of lock washer wherein these extended work-gripping edges are formed by twisting the leaves or tongues at their junction with the washer body so that the leaves or tongues are slightly rotated about their longitudinal axes and without warping the leaves themselves.

Another object of my invention is to provide a lock washer which is generally of new and improved construction, being manufactured at a comparatively low cost, and which is exceedingly efficient in operation.

With the foregoing and certain other objects in view, which will appear later in the specification, my invention comprises the devices described and claimed and the equivalents thereof.

Referring now to the drawings in detail:

Figure 1 is a plan view of part of a washer embodying my improvement;

Figure 2 is a developed view of the edge of the part shown in Figure 1;

Figure 3 is a plan view of a part of the washer showing a modified form of the tooth;

Figure 4 is a developed edge view of the modified teeth shown in Figure 3;

Figures 5 and 6 are fragmentary plan views showing modified arrangements of the slits or kerfs;

Figure 7 is a section on line 7—7 of Figure 1;

Figure 8 is a developed edge view of a tooth construction using the notched type shown in Figure 6 and wherein the edges of the leaves are flanged axially or along lines parallel with its lateral edges and out of the plane of the stock in accordance with the showings of Figures 1, 2 and 7;

Figure 9 is a developed edge view of a washer using the notched tooth construction shown in Figure 5, and wherein the leaves thereof are flanged, bent or twisted axially along lines parallel with its lateral edges in a manner shown in Figures 1, 2 and 7; and Figure 10 is a developed edge view of a tooth construction after the manner of Fig. 2, but wherein the lateral edges are thinner than the stock of the prongs to provide a more positive biting edge.

My improvement with respect to increasing the length of the biting edge may be brought about in either of two ways, both of which will be described and claimed herein.

As clearly shown in the drawings, Fig. 1 indicates the body of the washer which may be flat or of other suitable shape. In the present instance the washer is preferably shown as made by punching the center out of a piece of spring steel to provide a bolt passage. The leaves or tongues 2 are formed by a plurality of slits, kerfs or notches extending outwardly from a body 1. These slits or kerfs may be formed radially as shown in Figures 1, 2, 3, and 6, r may be formed non-radially as in Figure 5.

At the inner ends of the slits 3 the body of the metal is provided with a slit, or notched portion 4, herein shown as a hole preferably of greater diameter than the notch or slit, and which hole extends laterally or circumferentially beyond the edges of the notches or slits 4. These holes join and communicate with the notches or slits, and not only prevent splitting or cracking of the washer body at the inner ends of the slits during manufacture or use, but also have the further function of increasing the length of the effective biting edge, keeping it rectilinear or unwarped, and thereby increase correspondingly the gripping power of the washer to resist unscrewing the nut.

This latter function is shown clearly in Figures 1, 2, 7, 8, 9, and 10 of the drawings, where each tongue 2 has its main part in the plane of the washer body 1, and the opposed edges only of the tongues are bent or deflected axially by flanging or bending them along the line X—X parallel to the edge of the tongue or leaf and into the hole 4. In this manner the edges are thereby equally offset their full length and are spaced from the plane of the body as shown in Figure 7, one edge 5 being bent down and the other edge being bent up. Bending the edges 5 and 6 so as to offset them equally throughout their entire length without warping the main part of the tongue or leaf 2 is made entirely possible in the preferred construction of Figures 1, 2, 7, 8, 9 and 10, and substantially so in the modification shown in Figure 3 by the presence of the holes or cuts 4, which permit offsetting without warping or twisting the biting edges. By reference to Figures 2, 8, 9, and 10, it will be seen that these marginal portions of the tongues which are thus deflected out of the plane of the tongue are substantially equal to the thickness of the stock, and that such portion is substantially square in cross-section, and that the portion of the free edge of the tongue which is most laterally displaced from the plane of the body of the washer or tongue is deflected a distance which is preferably not as great as the thickness of the stock whereby an extremely rigid and rugged biting tooth is provided which has an effective strutting action.

In Figures 5, 6, 8 and 9 of the drawings I have shown a modified arrangement of slits. In Figure 5, instead of slitting the metal, the separate leaves are formed by notching or kerfing the metal. In this form, the notches are formed with non-parallel sides; they incline inwardly toward the holes 4. This type of notch is preferably used in connection with the laterally bent edge construction shown in Figures 1, 2, and 7 to produce the extended biting edges of the metal shown in Figure 9, and it will be noted that in this form sufficient stock or material is removed from the body between the tongues to prevent said tongues from overlapping in the event that they stretch as the result of being bent obliquely. The removal of this extra metal is advantageous because in bending the tongues relative to the body in manufacture or in their use the metal has a tendency to stretch and tends to increase the circumferential length of the tongues, wherefore I have found that by removing a sufficient metal in forming these tongues, any possible overlapping due to stretching is eliminated.

In Figures 6 and 8 I have shown another arrangement of notched construction wherein the free edges forming the tongues are parallel so as to provide tongues which taper inwardly. Likewise in this construction sufficient metal is removed between the tongue to prevent any possible overlapping of the tongues in the event that the metal thereof tends to stretch in bending. In both of these constructions of Figs. 5 and 6, as in the constructions of Figures 1, 2, and 7, it will be noted that the deflected portion of the lateral edges of the tongues is of relatively small cross-section, being substantially of the thickness of the stock, or in other words, substantially square in cross-section, and it will also be noted that the extended biting edges formed by these deflected portions project laterally in opposite directions from the surface of the washer body a distance not as great, preferably, as the thickness of the stock. By this construction great rigidity of tooth structure is provided, along the entire length of the tooth, and an effective strutting action is secured.

It will also be noted that by providing the laterally extending cuts or holes 4, means is provided for increasing the length of the effective biting edge and keeping it rectilinear or unwarped, thereby correspondingly increasing the gripping power of this edge. It must be obvious that the holes 4 may have any equivalent shape which accomplishes the same function, such, for instance, as a laterally extending or circumferentially extending slit or any similarly extending parting in the metal at this point.

In Figure 10 of the drawings I have shown as a separate view the modification of the toothed structure shown in dotted lines in Figure 2 of the drawings. In certain of the other figures the biting edges are of the same thickness as the main part of the leaves, whereas in Figure 10 of the drawings, the lateral edges between the notches or slits may be thinner than the leaves and offset to a biting edge. I have found that the thinned edge cannot be completely flattened when the nut is clamped tight down upon the washer, and therefore never loses its capacity for biting into the nut as soon as the nut tends to unscrew. A positive lock is therefore obtained even before the nut has moved appreciably towards unscrewing.

In the modified form shown in Figures 3 and 4 of the drawings, the leaves or tongues 2 are twisted at their junction with the washer body 1, and consequently are slightly rotated about their longitudinal axes, but the leaves themselves are not warped. By reason of the holes 4—4 in Figure 3, the axial rotation but not warping of the leaves 2 takes place mostly at the junction between the holes as at 7, Figure 3. Consequently it is the edge 8 which may, for example, be offset downwardly, and the edge 9 offset upwardly, but they are not warped as regards their biting edges. Therefore leaves 2, which are twisted only between the holes 4, present longer and more effective biting edges than are presented by other structures having warped leaves with warped edges, but without holes corresponding to the holes 4 of my structure.

While I have shown my improvement as applied to a washer of the type in which the leaves extend radially outward, it is obvious that the improvement may also be employed on washers the teeth of which are on the inner instead of the outer periphery.

Having thus described my invention, what I claim as new and desire to secure by Letters Patent is:

1. A lock washer comprising an annular body having substantially radial slits terminating in holes and forming a plurality of radially disposed leaves, the part of each leaf between two of said holes comprising a narrowed neck, said neck warped by twisting to slightly rotate the leaf about its longitudinal axis, for the purposes set forth.

2. A lock washer comprising an annular body having substantially radial slits terminating in holes and forming a plurality of radially disposed leaves, that part only of the body of a leaf between adjacent slits being axially bent or twisted to slightly offset the edges of the leaf with respect to the plane of said washer body, and whereby said leaf is slightly flanged along lines parallel with its lateral edges, the slits being of such width that sufficient material is removed from the body between the tongues to prevent said tongues from overlapping in the event they stretch as a result of being bent obliquely.

3. A lock washer comprising an annular body having radial slits terminating in holes and forming a plurality of radially disposed leaves, the part of each leaf between two of said holes comprising a narrowed neck, said neck warped by twisting to slightly rotate the leaf about its longitudinal axis, the part of the leaf beyond said holes unaffected by said twisting at the neck, for the purposes set forth.

4. A lock washer comprising an annular body having radial slits terminating in holes and forming a plurality of radially disposed leaves, the part of each leaf between two of said holes comprising a narrowed neck, slightly twisted, the part of said leaf beyond said holes unaffected by said twisting at the neck, the said leaves formed with lateral edges of less thickness than the body of the washer.

5. A lock washer having a circular body of spring metal and radial prongs which at their roots are partially severed from said body, whereby the prongs may be bent upward or downward along their entire radial margins without tearing the metal, said prongs being bent along their entire radial margins out of the plane of the body to present work-engaging edges, the radial margins of adjacent prongs being spaced from each other circumferentially, whereby when said margins are pressed toward the plane of the body, interference will be avoided.

6. A lock washer formed of spring stock including an annular body portion and a plurality of prongs spaced along a margin thereof and extending in a substantially radial direction with respect to the axis of said washer, the opposed margins of each prong being deflected out of the plane of the washer body in opposite directions so as to present work-engaging edges positioned in planes spaced from and substantially parallel to the plane of the body portion, said adjacent edges being disposed on opposite sides of the plane of the body portion, the notches forming the prongs being of sufficient width to prevent the oppositely disposed margins of adjacent prongs from overlapping in the event that they stretch.

7. A lock washer formed of spring stock including an annular body portion and a plurality of prongs spaced along one margin thereof and extending in a substantially radial direction with respect to the axis of said washer, the opposed margins of each prong being deflected out of the plane of the washer body in opposite directions so as to present work-engaging edges positioned in planes spaced from and substantially parallel to the plane of the body portion, said adjacent edges being disposed on opposite sides of the plane of the body portion, and projecting from the plane of the body of the washer a distance no greater than the thickness of the body portion.

8. A lock washer formed of spring stock including an annular body portion and a plurality of prongs spaced along one margin thereof and extending in a substantially radial direction with respect to the axis of said washer, the opposed margins of each prong being deflected out of the plane of the washer body in opposite directions so as to present work-engaging edges positioned in planes spaced from and substantially parallel to the plane of the body portion, the deflected portion of each prong having a circumferential length substantially equal to the thickness of the stock of the annular body portion, said adjacent edges being disposed on opposite sides of the plane of the body portion.

9. A lock washer formed of spring stock including an annular body portion and a plurality of prongs spaced along one margin thereof and extending in a substantially radial direction with respect to the axis of said washer, the opposed margins of each prong being sufficiently deflected out of the plane of the washer body in opposite directions so that the outermost portion of each of such margins is spaced from the plane of the washer body a distance less than the thickness of the stock, and said outermost portions of each of said margins presenting work-engaging edges positioned in planes lying substantially parallel to the plane of the body portion, the edge of one prong being substantially parallel to the edge of the adjacent prong, said adjacent edges being disposed on opposite sides of the plane of the body portion.

10. A lock washer formed of spring stock including an annular body portion and a plurality of prongs extending in a substantially radial direction with respect to the axis of said washer, the opposed edge of each prong being deflected out of the plane of the washer body in opposite directions so as to present work-engaging edges positioned in planes spaced from and substantially parallel to the plane of the body portion, the edge of one prong being substantially parallel to the edge of the adjacent prong, and said adjacent edges being disposed on opposite sides of the plane of the body portion, the deflected portion of the opposed edges of each prong being substantially equal to the thickness of the stock of the body portion, and the outermost portion of each deflected edge being spaced from the plane of the washer body at a distance less than the thickness of the stock, the prongs being partially severed at their roots from the body of the washer, and a sufficient amount of stock being removed between adjacent prongs to prevent interference when the deflected portions are pressed down.

RICHARD T. HOSKING.